Figure 3:
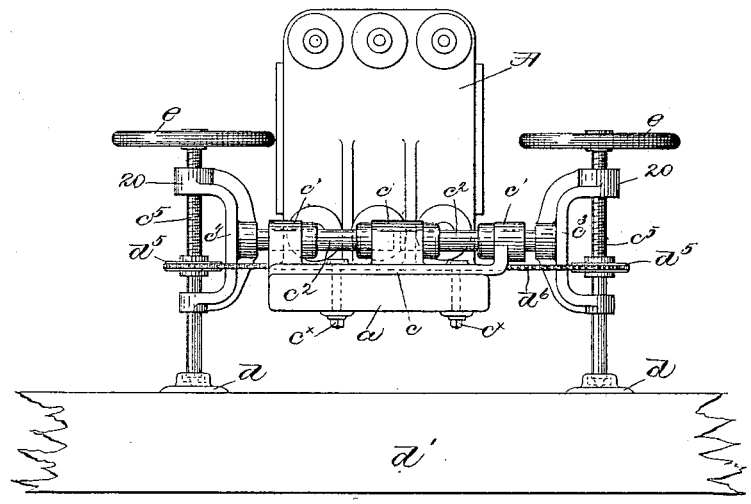

(No Model.) 2 Sheets—Sheet 1.
B. F. RADFORD.
BELT CONTROLLER FOR DYNAMO MACHINES.
No. 350,154. Patented Oct. 5, 1886.
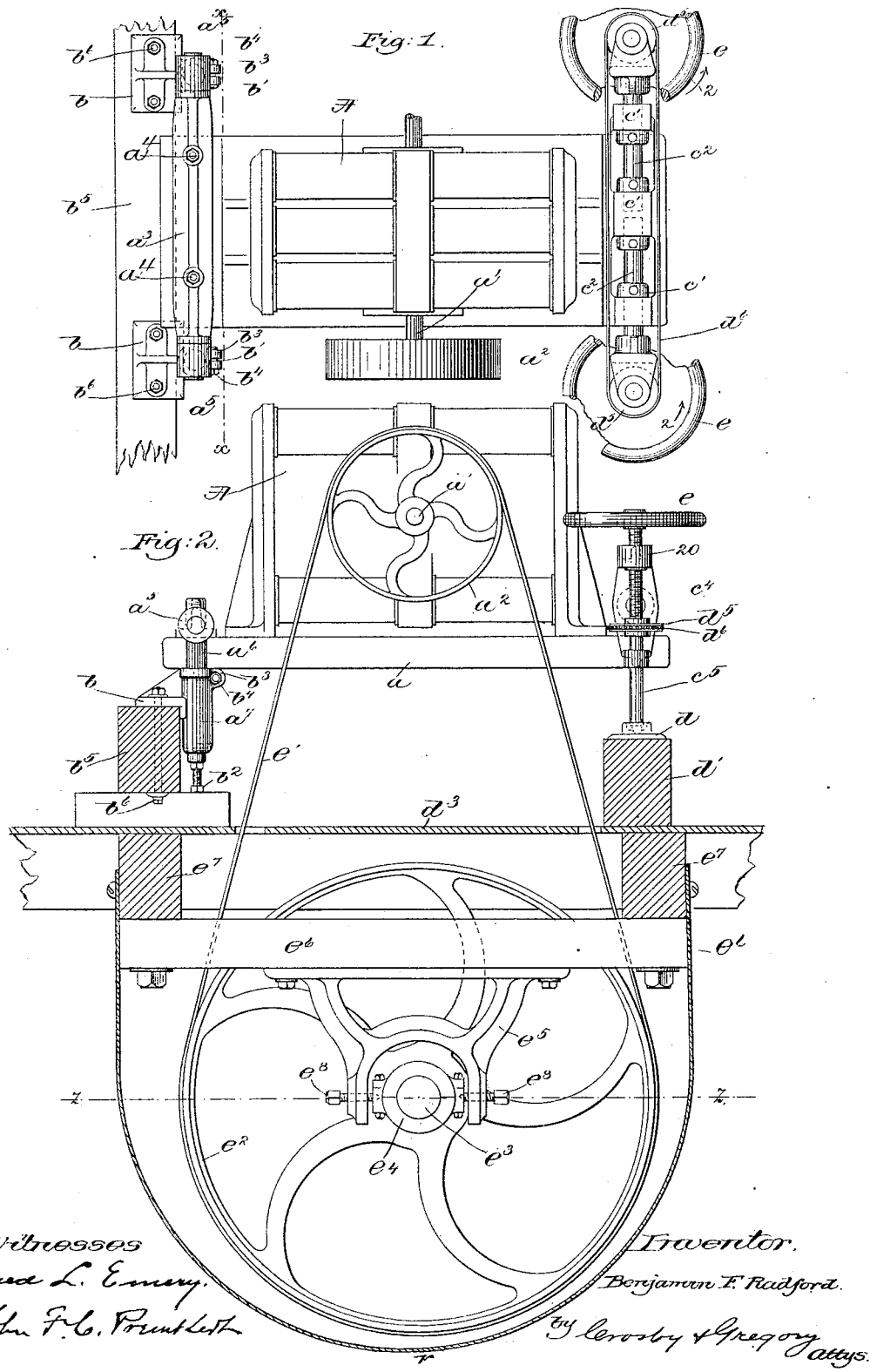

(No Model.) 2 Sheets—Sheet 2.

B. F. RADFORD.
BELT CONTROLLER FOR DYNAMO MACHINES.

No. 350,154. Patented Oct. 5, 1886.

Witnesses
Fred L. Emery.
John F. C. Prentiss.

Inventor.
Benjamin F. Radford
by Crosby & Gregory
attys.

UNITED STATES PATENT OFFICE.

BENJAMIN F. RADFORD, OF HYDE PARK, MASSACHUSETTS.

BELT-CONTROLLER FOR DYNAMO-MACHINES.

SPECIFICATION forming part of Letters Patent No. 350,154, dated October 5, 1886.

Application filed February 19, 1886. Serial No. 192,534. (No model.)

*To all whom it may concern:*

Be it known that I, BENJAMIN F. RADFORD, of Hyde Park, county of Norfolk, and State of Massachusetts, have invented an Improvement in Belt-Controllers for Dynamo-Machines, of which the following description, in connection with the accompanying drawings, is a specification, like letters on the drawings representing like parts.
Dynamo or magneto-electric machines or motors in electric-light stations are now usually driven by means of belts extended from frictional clutch-pulleys on a line of main shafting, the said belts being extended about the pulleys on the armature-shafts of such machines, and to stop any one or all of the series of machines the friction-pulley upon which is placed the driving-belt for the dynamo-machines to be stopped is released from the part of the friction-pulley which is fast upon the main shaft, thus permitting that part of the friction-pulley which receives the belt about it to run loose on its part of the main shaft.

I am also aware that the frame of a dynamo has been pivoted at one end, and that a screw at its other end has been used to cause the belt-pulley on the armature-shaft to be forced more or less closely into the bight of the belt employed to drive the said shaft, the adjustment of the frame of the machine enabling the tension of the said driving-belt to be adjusted as desired.

In the invention herein contained the series of dynamo or magneto-electric machines or motors are driven from a main or other shaft located below and having its axis of rotation substantially parallel to the axis of rotation of the armature-shafts of the dynamo-machines to be driven, the dynamo-machines or their bed-plates being adjustably supported in such manner as to enable the pulleys on their shafts to be made to approach or to recede from the pulleys on the main shaft, to slacken or tighten the driving-belts, thus permitting the said machines to be stopped or started, the belts, when the machines are lowered, falling by gravity away from and hanging slightly below the ordinary belt-pulleys keyed upon the main or other driving shaft employed to actuate the series of dynamo or magneto-electric machines or motors. In this way, when any machine is lowered, the rotation of its armature-shaft stops, and its belt hangs below but substantially out of contact with the pulley for driving it, the said pulley, however, continuing to move at the speed due to the motion of the main or other dynamo driving shaft.

Figure 4:
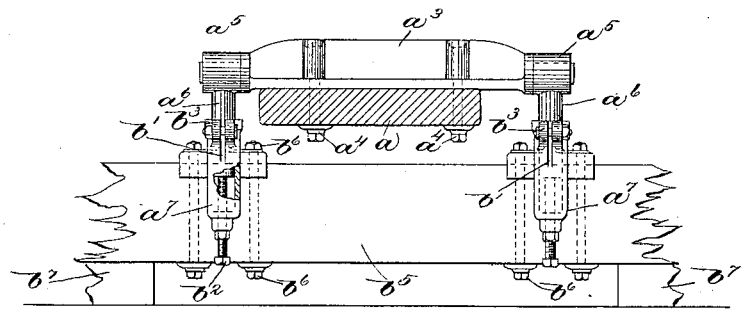

Figure 1 is a plan view of a dynamo-machine provided with my improved adjusting mechanism, the commutator being omitted and the armature-shaft on that side of the machine being broken off; Fig. 2, a side view of a dynamo-machine provided with my improved adjusting mechanism, and located above the floor, and driven by a belt on a pulley keyed to a main driving-shaft below the said floor, the supporting-beams for the adjusting mechanism and the floor and its supporting-beams being in section; Fig. 3, a right-hand end view of Fig. 1, with the armature-pulley removed; and Fig. 4 a sectional view of Fig. 1 in line $x$ $x$, looking toward the left.

The dynamo or magneto-electric machine or motor A, having a bed, $a$, and an armature-shaft, $a'$, provided with a belt-pulley, $a^2$, is and may be of any well-known type now commonly in use. The bed $a$, herein shown, is secured at one end by bolts $a^4$ to the axle $a^3$, (see Fig. 4,) adapted to tip or turn in bearings $a^5$, having arms $a^6$, which, as herein shown, are extended into cylindrical guides $a^7$, integral with the plates $b$. (See Figs. 1 and 2.) Each guide $a^7$, as herein shown, is slotted at one side, as at $b'$, (see Fig. 4,) to facilitate the entrance of the arms $a^6$, the inward movement of each of said arms being limited by the adjustable stop screw or bolt $b^2$. The slotted side of each guide is provided with ears $b^3$, (see Fig. 2,) to receive a bolt, $b^4$, by which the arm $a^6$ is securely held in its adjusted position within said guide. The plates $b$ receive bolts $b^6$, that serve to secure the said cylindrical guides to the supporting-beam $b^5$, the beam resting upon timbers $b^7$ on the floor $d^8$.

As herein shown, the bed $a$ at its opposite end has secured to it, by bolts $c^×$, (see Fig. 3,) a plate, $c$, provided with upwardly-projecting hubs $c'$, which receive the shaft $c^2$, having its ends placed in hubs of the yoke-pieces $c^3$ $c^4$. The yokes referred to receive the adjustable supports for the bed of the machine, the said supports, as herein shown, consisting of screw-threaded spindles $c^5$, which are by their threaded portions made to engage a threaded part, 20, of each yoke, the lower ends of the said threaded spindles resting and turning in foot-plates $d$, of metal, the said plates resting on the beam, $d'$. Each of the spindles $c^5$ has secured to it a chain-wheel, $d^5$, and a chain, $d^6$, passing over the said chain-wheels, causes the said spindles to revolve in unison with each other when either is revolved by turning one of the wheels $e$ secured to each spindle. The axle $a^3$, free to rock in its bearings $a^5$, permits the dynamo-machine to be tipped or lowered from a normal or substantially horizontal to an abnormal or oblique position when either of the spindles $c^5$ is revolved in the direction of the arrow 2. (See Fig. 1.) The revolution of the spindles $c^5$ in the direction mentioned permits the pulley $a^2$ to approach the main driving-pulley $e^2$, which permits the belt $e'$, passed over the said pulleys, to fall by gravity away from the pulley $e^2$, which done, the pulley $a^2$ is no longer driven positively, and the armature-shaft $a'$ ceases to rotate and the dynamo-machine is stopped. The shaft $e^3$ has bearings in journal-boxes $e^4$, supported in a bracket, $e^5$, by screws $e^8$, passing through said bracket and engaging the said boxes, as shown in Fig. 2, the said bracket being herein shown as attached to a cross-piece, $e^6$, bolted to the floor-supporting beams or joists $e^7$.

When it is desired to start the dynamo or magneto-electric machine or motor, which has been rendered inoperative, as above described, either spindle is revolved in a direction reverse to that indicated by the arrow 2, thus elevating the said machine from its oblique into a substantially horizontal position, causing the pulley $a^2$ of the said machine to recede from the main driving-pulley $e^2$, thereby lifting the belt $e$ into contact with the said main pulley, thus starting the rotation of the pulley $a^2$ and the armature-shaft $a'$.

In Fig. 2 I have shown a belt-rest, $r$, which occupies a position a short distance below the belt $e'$ and pulley $e^2$, the said rest, when the dynamo-machine is lowered, receiving the belt upon it, and immediately as the belt touches the rest it bulges laterally away from the pulley $e^2$ in the dotted line $z z$, and sufficiently far to clear it, the belt being thus relieved from all rubbing friction.

I claim—

1. A main or driving shaft provided with a fast pulley, and a dynamo or magneto-electric machine or motor having its armature-shaft substantially parallel to the said main shaft and located above it, and a belt connecting a pulley on the main shaft with a pulley on the armature-shaft, combined with a rocking support at one point and an adjustable support at another, whereby the pulley on the armature-shaft of said machine or motor may be made to approach the pulley on the main shaft to lower the driving-belt below and away from the pulley on the driving-shaft and leave the belt at rest, thereby stopping the machine or motor, and thereafter to recede from the pulley on the main shaft to raise the belt into engagement with the said main-shaft pulley and start the machine in operation, substantially as described.

2. A main or driving shaft provided with a pulley, a belt, a dynamo or magneto-electric machine or motor having its armature-shaft provided with a pulley, a rocking support, substantially as described, at one end, and a transverse shaft at its other end having screw-threaded end yokes, combined with screw-threaded spindles entering said yokes, and with chain-wheels and an endless chain engaging said wheels, to operate substantially as and for the purpose specified.

3. A main or driving shaft provided with a fast pulley, a dynamo or magneto-electric machine or motor having its armature-shaft substantially parallel to said main shaft and located above it, adjustable supports for said dynamo or magneto-electric machine or motor, and a belt connecting a pulley on the dynamo shaft with a pulley on the main shaft, combined with the rest $r$, located below the pulley on the driving-shaft, the said rest, when the machine is inoperative, receiving upon it the belt and supporting the same from contact with said main-shaft pulley, to thereby reduce the wear upon the said belt, substantially as described.

In testimony whereof I have signed my name to this specification in the presence of two subscribing witnesses.

BENJAMIN F. RADFORD.

Witnesses:
JAS. H. CHURCHILL,
G. W. GREGORY.